United States Patent
Bertero et al.

(10) Patent No.: US 8,565,050 B1
(45) Date of Patent: Oct. 22, 2013

(54) HEAT ASSISTED MAGNETIC RECORDING MEDIA HAVING MOMENT KEEPER LAYER

(75) Inventors: Gerardo A. Bertero, Redwood City, CA (US); David Treves, Palo Alto, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/332,290

(22) Filed: Dec. 20, 2011

(51) Int. Cl.
*G11B 11/00* (2006.01)

(52) U.S. Cl.
USPC .............. 369/13.38; 360/131; 428/831.2

(58) Field of Classification Search
USPC ......... 369/13.33, 13.13, 13.32, 13.02, 13.17, 369/13.07; 360/59, 135; 428/831.2
See application file for complete search history.

(56) References Cited

U.S. PATENT DOCUMENTS

| | | |
|---|---|---|
| 6,200,673 B1 | 3/2001 | Miyamoto et al. |
| 6,388,956 B1 | 5/2002 | Mori et al. |
| 6,468,670 B1 | 10/2002 | Ikeda et al. |
| 6,495,252 B1 | 12/2002 | Richter et al. |
| 6,551,728 B1 | 4/2003 | Acharya et al. |
| 6,707,766 B2 | 3/2004 | Mori et al. |
| 6,754,020 B1 | 6/2004 | Hikosaka et al. |
| 6,834,026 B2 | 12/2004 | Fullerton et al. |
| 6,881,497 B2 | 4/2005 | Coffey et al. |
| 6,950,260 B2 | 9/2005 | Coffey et al. |
| 7,060,375 B2 | 6/2006 | Lee et al. |
| 7,582,368 B2 | 9/2009 | Berger et al. |
| 7,588,841 B2 | 9/2009 | Berger et al. |
| 7,678,476 B2 | 3/2010 | Weller et al. |
| 8,179,637 B2 * | 5/2012 | Takeshita ............... 360/125.74 |
| 2001/0051287 A1 | 12/2001 | Kikitsu et al. |
| 2005/0163962 A1 * | 7/2005 | Kawato et al. ............ 428/65.3 |
| 2006/0002026 A1 * | 1/2006 | Stipe et al. .................. 360/135 |
| 2008/0226817 A1 * | 9/2008 | Lee ............................ 427/130 |
| 2009/0040644 A1 | 2/2009 | Lu et al. |
| 2010/0053811 A1 * | 3/2010 | Takeshita ................... 360/110 |
| 2010/0110577 A1 | 5/2010 | Weller et al. |
| 2010/0182714 A1 | 7/2010 | Kanbe et al. |

FOREIGN PATENT DOCUMENTS

JP 2003085702 3/2003

OTHER PUBLICATIONS

Takenoiri et al. "Structural Control Method for Perpendicular Magnetic Recording Film", Fuji Electric Review, vol. 50, No. 3, pp. 81-84, 2004.

Thiele, et.al."Temperature Dependent Magnetic Properties of Highly Chemically Ordered Fe55-xNixPt45L1o Films," Journal of Applied Physics, vol. 91, No. 10, pp. 6595-6600, May 15, 2002.

* cited by examiner

Primary Examiner — Tan X Dinh

(57) ABSTRACT

Systems and methods for providing media having a moment keeper layer for heat assisted magnetic recording (HAMR). One such method for writing information to a magnetic media having a moment keeper layer using heat assisted magnetic recording includes heating a portion of the media to a preselected temperature, where the media includes a magnetic recording layer adjacent to the keeper layer, where a Curie temperature of the keeper layer is greater than a Curie temperature of the recording layer, and where the preselected temperature is about equal to, or greater than, the Curie temperature of the recording layer, allowing the portion of the media to cool, and writing information to the media during the cooling.

8 Claims, 3 Drawing Sheets

HEAT ASSISTED MAGNETIC RECORDING MEDIA HAVING MOMENT KEEPER LAYER

FIELD

The present invention relates to magnetic recording technology, and more specifically to systems and methods for providing media having a moment keeper layer for heat assisted magnetic recording (HAMR).

BACKGROUND

To achieve high areal density for current magnetic storage drives, energy-assisted magnetic recording (EAMR) is commonly applied. In EAMR, the recording medium is locally heated to decrease the coercivity of the magnetic material during write operations. The local area is then rapidly cooled to retain the written information. This allows for magnetic write heads to be used with high coercivity magnetic materials. The heating of a local area may be accomplished by, for example, a heat or thermal source such as a laser. As such, one type of energy-assisted magnetic recording is heat assisted magnetic recording (HAMR).

Conventional HAMR media is typically composed of a substrate, a heat sink layer, seed and nucleation layers, and a magnetic recording layer. Desirable properties of the magnetic recording layer in HAMR media include a moderate Curie temperature and a uniform, well-segregated, high magnetic anisotropy grain structure with highly developed crystallographic texture. Writing to magnetic media in HAMR involves heating a localized area of the media to temperatures near or above the Curie temperature of the storage layer. This is done to locally lower the coercivity of the media. The direction of magnetization in the recorded bit is then set by an applied field. The recording process in HAMR media is important for defining the magnetization transitions. Sharp, well defined transitions are needed in order to achieve high recording linear densities. As such, an improved magnetic media for HAMR applications that can provide such well defined transitions to achieve the high recording linear densities is desirable.

SUMMARY

Aspects of the invention relate to systems and methods for providing media having a moment keeper layer for heat assisted magnetic recording. In one embodiment, the invention relates to a method for writing information to a magnetic media having a moment keeper layer using heat assisted magnetic recording, the method including heating a portion of the media to a preselected temperature, where the media includes a magnetic recording layer adjacent to the keeper layer, where a Curie temperature of the keeper layer is greater than a Curie temperature of the recording layer, and where the preselected temperature is about equal to, or greater than, the Curie temperature of the recording layer, allowing the portion of the media to cool, and writing information to the media during the cooling.

In another embodiment, the invention relates to a magnetic media for heat assisted magnetic recording, the magnetic media including a substrate, at least one intermediate layer on the substrate, a magnetic recording layer on the at least one intermediate layer, and a keeper layer on the at least one intermediate layer, where a Curie temperature of the keeper layer is greater than a Curie temperature of the recording layer, and where the keeper layer includes a one to one grain correspondence with the recording layer.

DETAILED DESCRIPTION

Figure 1:
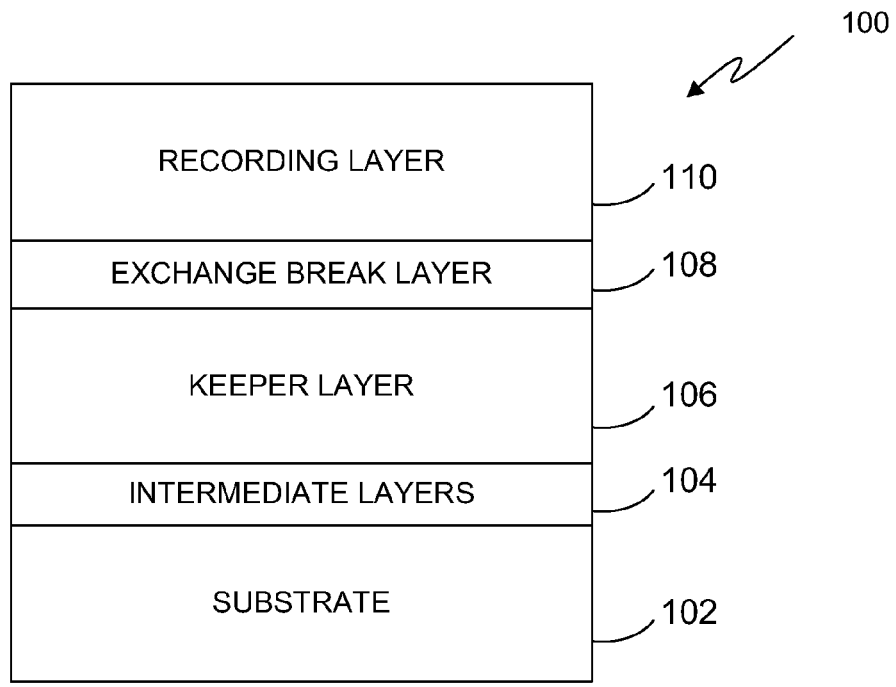
FIG. 1 is a side view of a magnetic media structure including a recording layer on a moment keeper layer for use with heat assisted magnetic recording in accordance with one embodiment of the invention.

Referring now to the drawings, embodiments of magnetic media including a moment keeper layer and processes for writing to the media are illustrated. The media include a recording or storage layer positioned on a substrate and the moment keeper layer positioned on the substrate where the Curie temperature of the keeper layer is greater than the Curie temperature of the recording layer. In several embodiments, the keeper layer has a one to one grain correspondence with the recording layer. In one embodiment, the recording layer is on the keeper layer. In another embodiment, the keeper layer is on the recording layer. In some embodiments, an exchange break layer is positioned between the recording layer and the keeper layer.

The processes for writing to the media include heating a portion of the media to a preselected temperature, allowing the portion of the media to cool, and writing information to the media during the cooling. In several embodiments, the magnetic anisotropy and magnetization of the keeper layer is greater than that of the recording layer at the preselected temperature. In a number of embodiments, the improved media and writing processes provide for high recording linear densities.

FIG. 1 is a side view of a magnetic media structure 100 including a recording layer 110 on a moment keeper layer 106 for use with heat assisted magnetic recording in accordance with one embodiment of the invention. The media structure 100 includes a stacked structure with a substrate 102 at a base of the stack, one or more intermediate layers 104 on the substrate 102, the keeper layer 106 on the intermediate layers 104, an exchange break layer 108 on the keeper layer 106, and the recording layer 110 on the exchange break layer 108. In some embodiments, the exchange break layer 108 is not used in the media structure 100.

The materials of the keeper layer 106 are selected such that the Curie temperature of the keeper layer 106 is greater than the Curie temperature of the recording layer 110. In one embodiment, for example, the keeper layer 106 is made of FeCo, FeCoNi. FePdCo, $Co_2XY$(X:Cr, Mn, Fe, Nb, Y:Al, Ga, Sn), $Cu_2MnGa$, $Au_2MnAl$, CuMnAl, FeMoNi, $(FeCo)_2$MnSi, CoCrPt, FeCr, or another suitable material known in the art. In such case, the recording layer 110 is made of FePt, FeNiPt, FeCoPt, FeCuPt, FePtC, FePtAgC, or another suitable material known in the art. The EBL 108, intermediate layers 104, and substrate 102 can be made of suitable materials known in the art.

In a number of embodiments, the keeper layer 106 is configured to have a one to one grain correspondence with grains of the recording layer 110. In such case, the keeper layer 106 can provide for minimal or no intergranular/lateral exchange coupling while providing for strong vertical exchange coupling with the recording layer 110. In some embodiments, the keeper layer 106, in having the one to one grain correspondence, is effectively configured to substantially avoid or suppress lateral exchange coupling. In several embodiments, other beneficial effects associated with the one to one grain correspondence include better coercivity, lower noise during reading and writing, and as a consequence of the lower noise, higher signal to noise ratios. In several embodiments, the recording layer 110 has relatively high magnetic anisotropy (e.g., Ku).

In operation, an EAMR heat source such as a laser can heat a spot or portion of the media 100 to a preselected temperature that is about equal to, or greater than, the Curie temperature of the recording layer. As the media is heated, the coercivity of the recording layer 110 is lowered as well as the magnetization and magnetic anisotropy of the recording layer. Once the preselected temperature is reached, the media can be allowed to cool for a preselected time period or to cool to a preselected temperature. During the cooling process (e.g., refreeze process), information can be written to the media by applying a magnetic field.

While not bound by any particular theory, the purpose of the keeper layer 106 is to help orient (order) the magnetic moment of the recording/storage layer 110 grains during the refreeze process under the influence of the applied field when the magnetization of the recording layer 110 is very small as it cools from its Curie point. At that time, the magnetization of the keeper layer 106 is well defined and of higher magnitude compared to that of the recording layer 110 as it is further away from its own Curie point. With intergranular exchange coupling substantially suppressed in the keeper layer 106, the location of the transitions should be minimally influenced by the presence of the keeper layer 106. However, the transition sharpness should be enhanced by the presence of the keeper layer, thus improving the linear density capability of the system.

Figure 2:
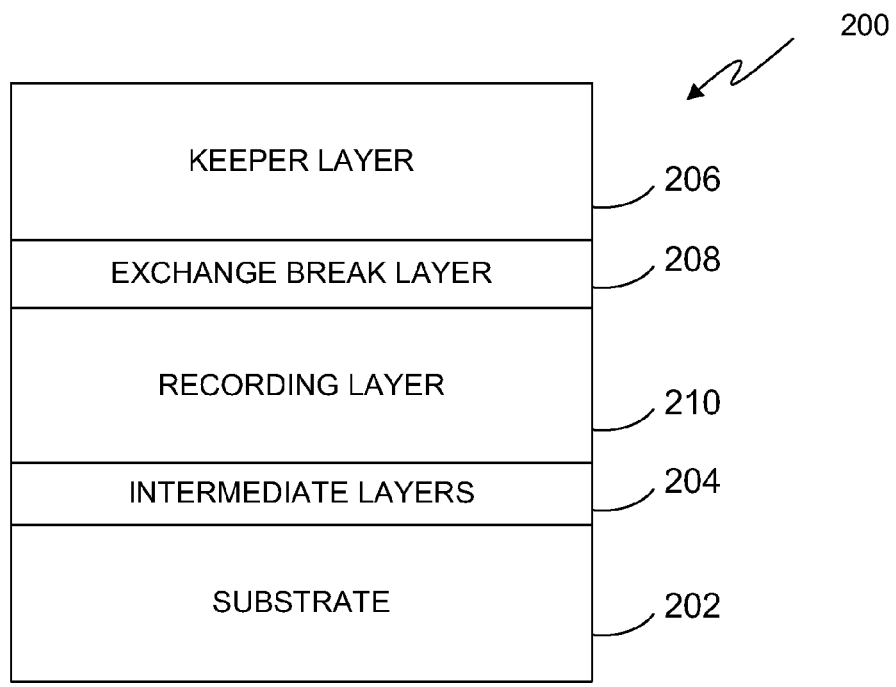
FIG. 2 is a side view of another magnetic media structure including a moment keeper layer on a recording layer for use with heat assisted magnetic recording in accordance with one embodiment of the invention.

FIG. 2 is a side view of another magnetic media structure 200 including a moment keeper layer 206 on a recording layer 210 for use with heat assisted magnetic recording in accordance with one embodiment of the invention. The media structure 200 includes a stacked structure with a substrate 202 at a base of the stack, one or more intermediate layers 204 on the substrate 202, the recording layer 210 on the intermediate layers 204, an exchange break layer 208 on the recording layer 210, and the keeper layer 206 on the exchange break layer 208. In some embodiments, the exchange break layer 208 is not used in the media structure 200. The materials of the keeper layer 206 are selected such that the Curie temperature of the keeper layer 206 is greater than the Curie temperature of the recording layer 210. In operation, the media 200 can perform and/or operate in the manner described above for the media 100 of FIG. 1. In several embodiments, the layers of the media structure 200 can be formed of the same materials as described above for the media 100 of FIG. 1.

Figure 3:
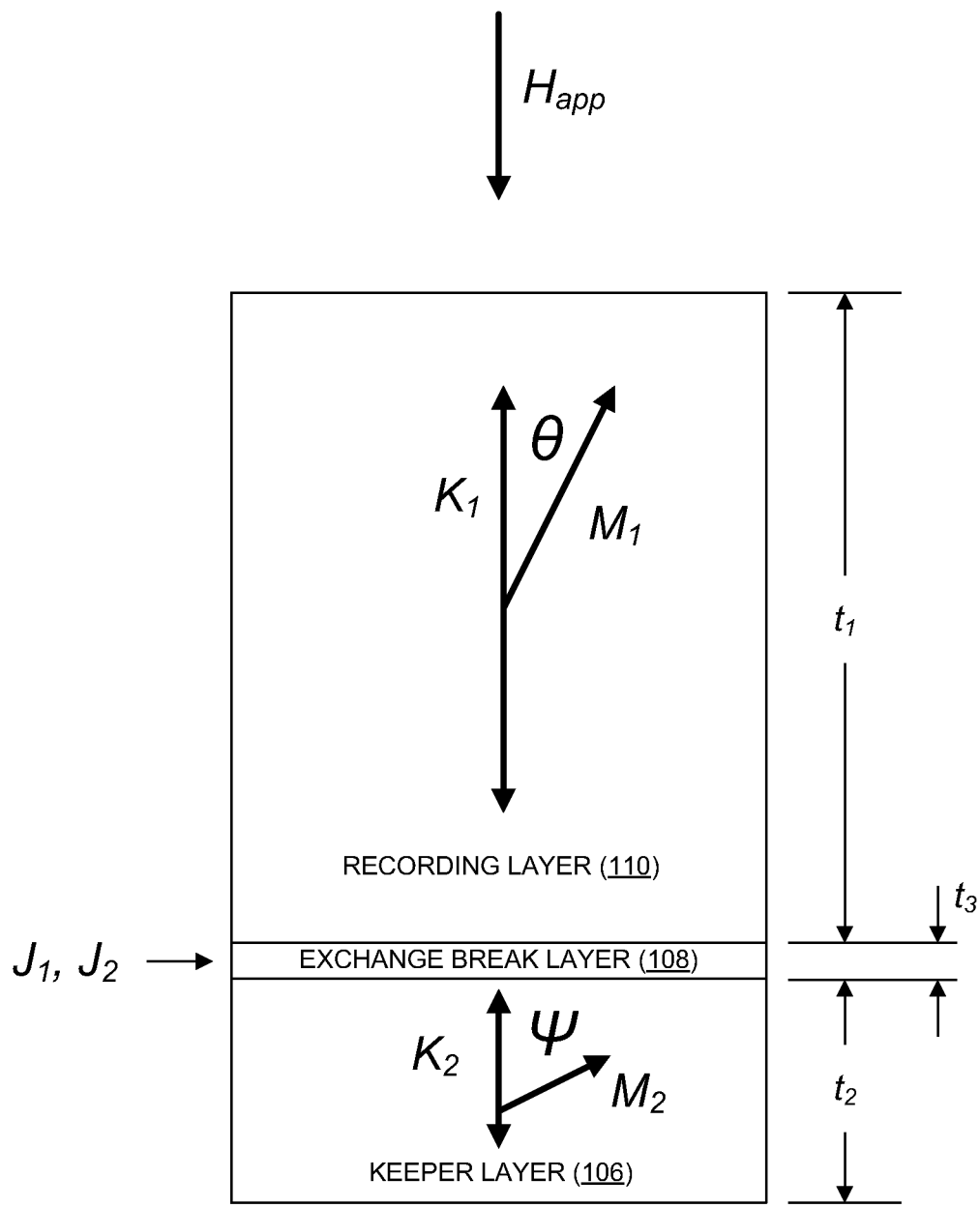
FIG. 3 is a side view of a single grain column of the magnetic media structure of FIG. 1 including the recording layer on the moment keeper layer for use with heat assisted magnetic recording in accordance with one embodiment of the invention.

FIG. 3 is a side view of a single grain column of the magnetic media structure of FIG. 1 including the recording layer 110 on the moment keeper layer 106 for use with heat assisted magnetic recording in accordance with one embodiment of the invention. While not bound by any particular theory, the total energy of the single grain column of FIG. 3 can be analyzed to get an idea of the magnitude of the effects being discussed. The hard recording layer (e.g., layer 1) 110 of the single grain column includes characteristics $K_1$, $M_1$ and $t_1$ which are the magneto-crystalline anisotropy energy, magnetization and thickness, respectively. Meanwhile, $K_2$, $M_2$ and $t_2$ are the corresponding values for the lower anisotropy keeper layer 106 (e.g., layer 2). The bilinear coupling constant, $J_1$, and bi-quadratic coupling constant, $J_2$, are interfacial exchange coupling constants mediated by the exchange break layer 108 of thickness $t_3$. Since the exchange break layer material would be typically be weakly magnetic or non-magnetic, $J_1$ and $J_2$ will be strong functions of $t_3$ decreasing in strength as $t_3$ increases. In the absence of an exchange break layer (EBL), $J_1$ and $J_2$ will correspond to fully exchange coupled layers, recording layer 110 and keeper layer 106.

Under the influence of an applied field H ($H_{app}$), the total energy of the system is given by adding the contributions from the magneto-crystalline energy and Zeeman energy terms for the recording layer 110 and the keeper layer 106 and the interfacial energy terms provided by the EBL 108.

$$E = K_1 \cdot t_1 \cdot \mathrm{Sin}^2(\theta) + K_2 \cdot t_2 \cdot \mathrm{Sin}^2(\psi) - H \cdot M_1 \mathrm{Cos}(\theta) - H \cdot M_2 \mathrm{Cos}(\psi) - J_1 \cdot \mathrm{Cos}(\psi - \theta) - J_2 \cdot \mathrm{Cos}^2(\psi - \theta)$$

The presence of the keeper layer 106 helps to order the magnetization of the recording layer 110 during the refreeze process under the influence of the applied field H.

As stated previously, the Curie temperature for the keeper layer 106 is higher than that of the recording layer 110, and therefore it is expected that $M_2$ will be much higher than $M_1$ at the moment of writing. For a given thickness $t_3$, the magnitude of $J_1$ and $J_2$ will depend on $M_1$, $M_2$ and temperature (T). Typical interfacial energy values for $J_1$ at room temperature range from about 0.2 to 10 erg/cm$^2$ corresponding to effective fields of a few hundred to a few thousand Oe. The bi-quadratic coupling energy $J_2$ is normally half to one order of magnitude smaller than $J_1$.

Phenomenologically, the magneto-crystalline anisotropy will be a function of temperature. Normally it is expressed as:

$$\frac{K_1(T)}{K_1(T_0)} = \left[\frac{M_s(T)}{M_s(T_0)}\right]^n$$

The value of the exponent, n, is experimentally found to be between about 1.5 and 3 for magnetic materials with uni-axial anisotropy. This relation should apply to the recording layer and the keeper layer but not necessarily with the same exponent n.

For fully L1$_0$ ordered FePt, $K_1(T_0)$ provides about $4.5 \times 10^7$ erg/cc and $M_1$ is about 1125 emu/cm$^3$. At the Curie temperature for this material, approximately 770K, both $K_1$ and $M_1$ vanish. The expected applied field H magnitude in a HAMR application is about 0.5 to 1.5 Tesla.

The value of $K_2$ should be such that it is easily switchable magnetically by the applied field H at the writing temperature but high enough to keep $M_2$ perpendicular in the media at remanence at room temperature (K2 will depend on the value of interfacial exchange $J_{1,2}$ and $M_2$ among other parameters). $M_2$ should also be as high as possible at the writing temperature. This generally requires that the Curie point of the keeper layer material be significantly higher than that of the recording layer. Thus, it is expected that during magnetization refreeze, the exchange energy exerted by the keeper layer on the recording layer can significant in assisting the ferromagnetic ordering and switching of the magnetic grains in the recording layer.

Figure 4:
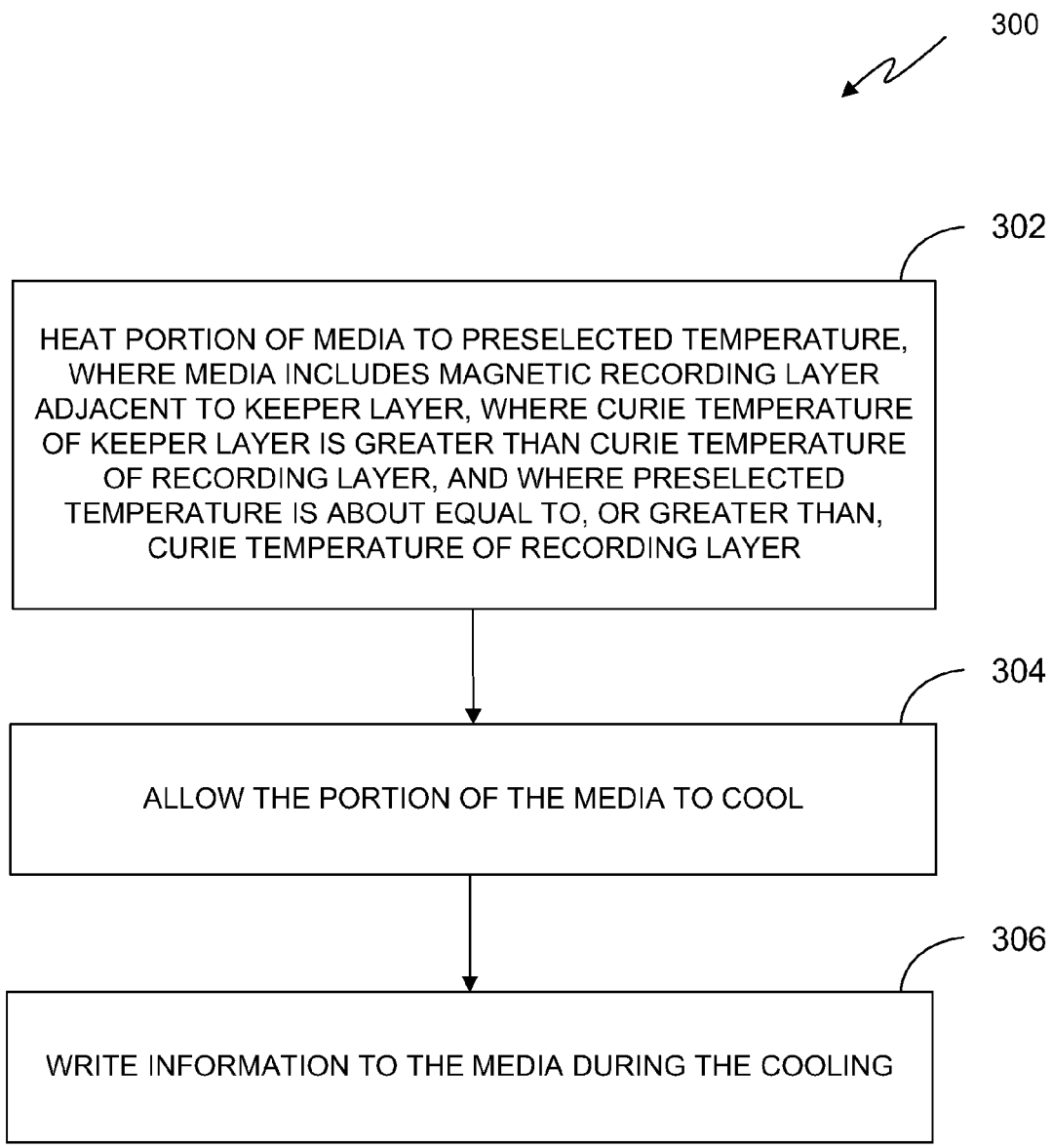
FIG. 4 is a flowchart of a process for writing information to a magnetic media structure including a moment keeper layer for use with heat assisted magnetic recording in accordance with one embodiment of the invention.

FIG. 4 is a flowchart of a process 300 for writing information to a magnetic media structure including a moment keeper layer for use with heat assisted magnetic recording in accordance with one embodiment of the invention. In particular embodiments, the process 300 can be used in conjunction with the media structures of FIGS. 1-3. The process first heats (302) a portion of the media to a preselected temperature, where the media includes a magnetic recording layer adjacent to the keeper layer, where a Curie temperature of the keeper layer is greater than a Curie temperature of the recording layer, and where the preselected temperature is about equal to, or greater than, the Curie temperature of the recording layer. The process then allows (304) the portion of the media to cool. The process then writes (306) information to the media during the cooling.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In several of the figures, components appear to have particular dimensions. However, the components are not drawn to scale and can have other suitable dimensions in other embodiments.

What is claimed is:

1. A magnetic media for heat assisted magnetic recording (HAMR), the magnetic media comprising:
    a substrate;
    at least one intermediate layer on the substrate;
    a magnetic recording layer on the at least one intermediate layer; and
    a keeper layer on the at least one intermediate layer,
    wherein a Curie temperature of the keeper layer is greater than a Curie temperature of the recording layer, and
    wherein the keeper layer comprises a one to one grain correspondence with the recording layer.

2. The media of claim 1, wherein a magnetic anisotropy of the keeper layer is greater than a magnetic anisotropy of the recording layer at a preselected temperature.

3. The method of claim 1, wherein a magnetization of the keeper layer is greater than a magnetization of the recording layer at the preselected temperature.

4. The media of claim 1, wherein the keeper layer is on the recording layer.

5. The media of claim 1, wherein the recording layer is on the keeper layer.

6. The media of claim 1, further comprising an exchange break layer positioned between the keeper layer and the recording layer.

7. The media of claim 1, wherein the keeper layer comprises a minimal amount of lateral exchange coupling.

8. The media of claim 1, wherein the media comprises a vertical exchange coupling between grains of the keeper layer and grains of the recording layer.

* * * * *